Nov. 7, 1944.  W. A. ENDTER  2,362,255
DOOR LATCH
Filed Nov. 27, 1943  4 Sheets-Sheet 1
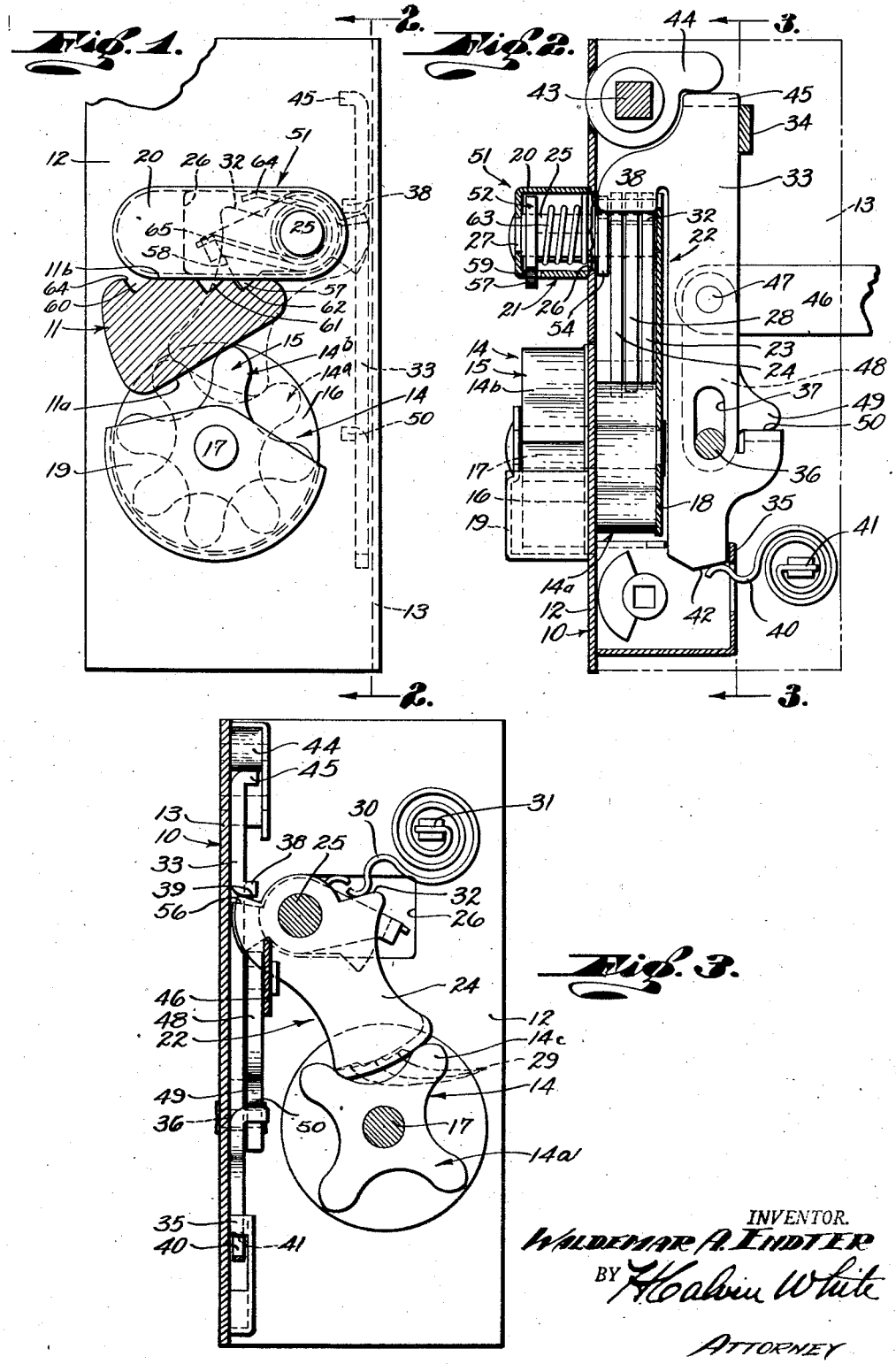
INVENTOR.
WALDEMAR A. ENDTER
BY H. Calvin White
ATTORNEY

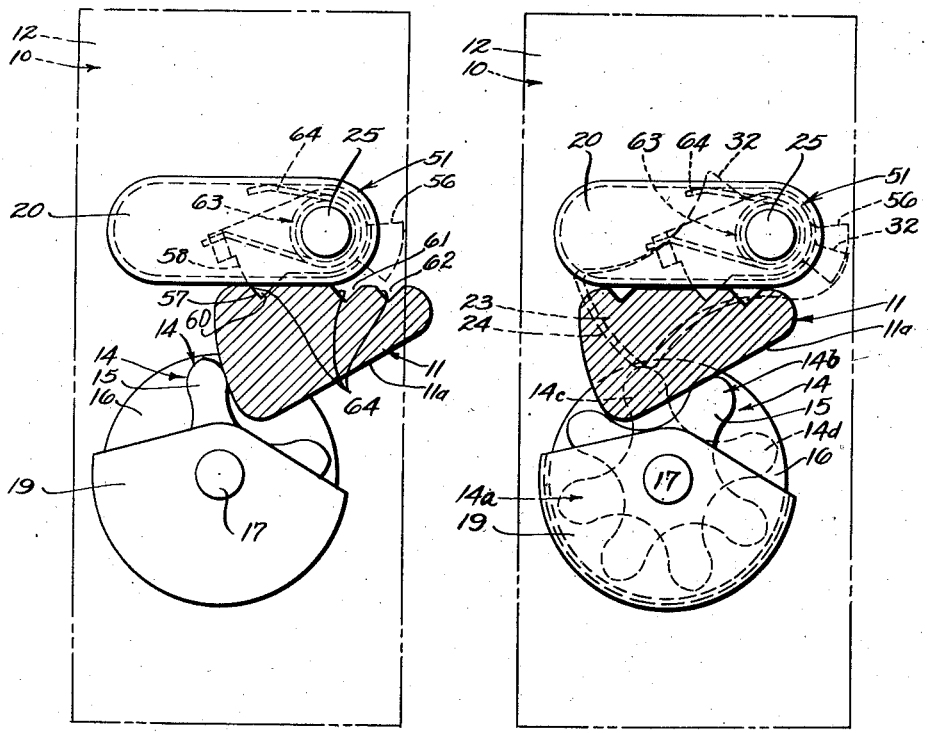
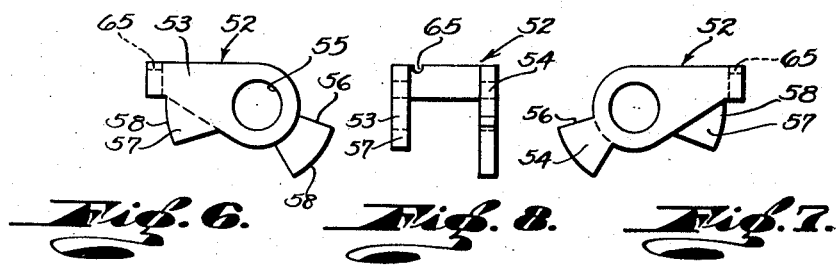

Nov. 7, 1944. W. A. ENDTER 2,362,255
DOOR LATCH
Filed Nov. 27, 1943 4 Sheets-Sheet 3

INVENTOR.
WALDEMAR A. ENDTER
BY H. Calvin White
ATTORNEY

Nov. 7, 1944. W. A. ENDTER 2,362,255
DOOR LATCH
Filed Nov. 27, 1943 4 Sheets-Sheet 4
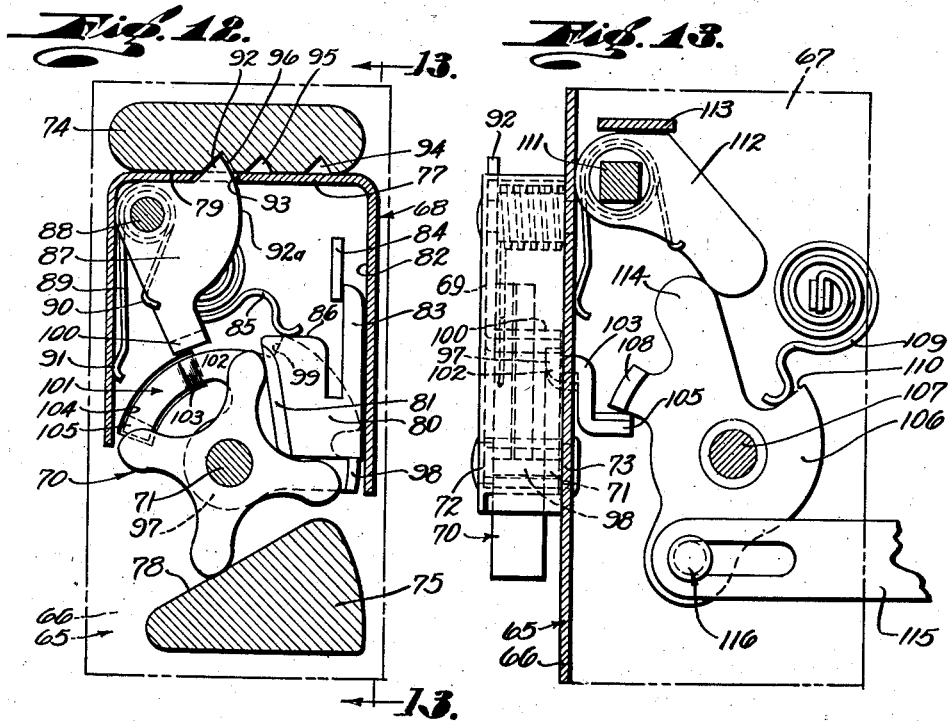
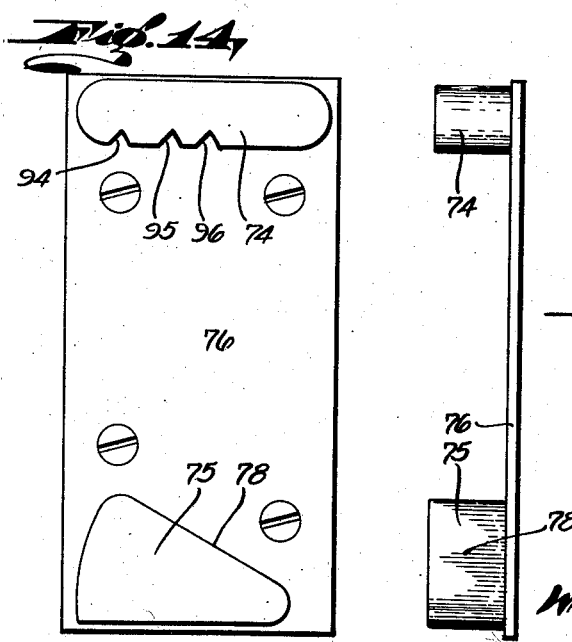

Patented Nov. 7, 1944

2,362,255

UNITED STATES PATENT OFFICE 2,362,255

DOOR LATCH

Waldemar A. Endter, Long Beach, Calif.

Application November 27, 1943, Serial No. 511,940

19 Claims. (Cl. 292—214)

This invention deals with improvements in lock or latch mechanisms, particularly of the type in which a keeper-engaging bolt is displaced during an initial stage of its latching advancement, against resistance imposed by an actuating means, and is then advanced toward a final latched position by the force or thrust of such actuating means.

One of the principal objects of the invention is to provide an improved auxiliary bolt or safety catch device having by reason of its unique structural and operational characteristics with relation to the coaction of the main latching bolt with its keeper and actuating mechanism, numerous advantages and safety features distinguishing it from various types of safety devices heretofore proposed.

The accomplishments of the invention may be better appreciated from a brief comparison with the actions and functions of the usual auxiliary holding devices or safety catches. Consider for example a rotary bolt type latch in which rotation of the bolt toward latched position after engagement with the keeper, first is resisted by a spring-urged camming means, and then, after passing the cam trip position, is urged by the camming means to fully latched position. A customary practice is to use an auxiliary holding means, commonly termed the safety catch, which assumes within the initial stage of the bolt rotation toward the cam-tripping point, a position such that the bolt is held, though comparatively loosely, against disengagement from the keeper if the bolt fails to become engaged in held relation by the camming means. Commonly such safety catches engage the bolt itself, and therefore are dependent upon the normal condition and functioning of the bolt.

Frequently it may happen that although seemingly held by the camming means, the bolt may not in fact be retained thereby, as when the bolt may wedge just at the cam tripping position, without the cam having been sufficiently displaced, or the bolt having been sufficiently advanced, to trip the camming means. Under this circumstance, a seemingly latched door may be suddenly released and the bolt or another part of the latch thrust or impacted against the safety catch as to damage the latter, particularly after repeated and forceful impacts against it. Also it may be observed that the usual latch mechanism has no means, and particularly a means independent of the bolt itself, which in the normal unlocked condition of the latch, operates automatically to hold the bolt against anti-latching rotation at a position beyond its position at the cam-tripping point.

In accordance with the invention I have provided an improved auxiliary bolt or safety-catch mechanism characterized in one important respect that it may have a series of holding positions with relation to the bolt positions in advance of and beyond the cam tripping position, as well as at substantially that position. Thus the invention retains all the advantages of the usual safety catch device, and affords the further advantages of positively holding the bolt at such other subsequent positions as will enable the latch parts to be held against accidental release from the cam tripping position, as well as from another position, or other positions, beyond the cam tripping position in the latch closing progression. The invention also contemplates the provision of such holding means operable independently of the bolt itself, and therefore capable of assuming the contemplated safety features independently of the condition of the bolt.

Throughout the following detailed description reference is had to the accompanying drawings illustrative of certain typical embodiments of the invention, and of the aforementioned features and objects. In the drawings:

Fig. 1 is a front elevational view of the latching mechanism, with the wedge keeper appearing in section and the parts in substantially fully latched or home position;

Fig. 2 is a section on line 2—2 of Fig. 1, the upper lug or keeper appearing in section to expose the safety catch and its associated parts;

Fig. 3 is a section on line 3—3 of Fig. 2;

Figs. 4 and 5 are views similar to Fig. 1, illustrating the relationship between the bolt, keepers and safety catch, respectively, at the initial and intermediate locking positions of the safety catch;

Figs. 6 and 7 are opposite end views of the safety catch element;

Fig. 8 is a side elevation of the safety catch as viewed from the left of Fig. 7;

Fig. 12 illustrates the parts in their latched or home positions;

Fig. 13 is a section on line 13—13 of Fig. 12; and

Figs. 14 and 15 are front and end elevations, respectively, of the keeper plate embodied in the variational form.

Figures 9, 10:
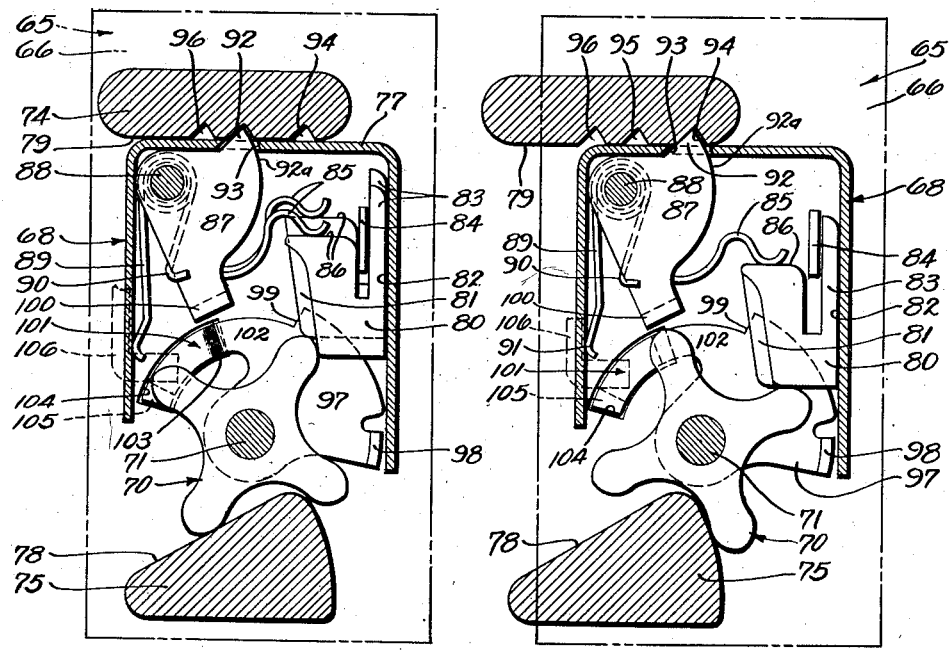
Fig. 9 is a sectional view illustrating a variational form of the invention, with the parts at substantially the initial safety catch position.
Fig. 10 is a similar view illustrating the positions of the parts at substantially the tripping point of the cam.

Considering first the form of the invention shown in Figs. 1 to 8, the device may be described generally as comprising a latch bolt and its actuating and control assembly contained within a case 10, adapted to be applied to one of two relatively movable members such as an automobile door, and a keeper 11 adapted to be fixed to the other of said members, e. g. the door pillar, in cooperative relation to the case-carried parts, all in a manner known to those familiar with the art. The case 10 comprises angular or flange portions 12 and 13 in the former of which is supported a keeper engaging bolt and certain bolt actuating and control mechanisms, all as will later appear. It will be understood that in certain broad aspects, the invention contemplates the use of any suitable type and form of bolt, together with appropriate actuating and control mechanisms therefor, operable in predetermined functional or positional relationship to the safety catch device and its different holding or locking positions. Preferably the latch mechanism proper is of the multi-headed rotary bolt type, in conjunction with which the safety catch device is rendered operable in predetermined relation to the relative positions of the rotary bolt and wedge keeper, and as a particular feature of importance, in predetermined relation also to the relative positions of the bolt and the bolt actuating or cam means.

In the embodiment shown the rotary bolt, generally indicated at 14, comprises a plurality (typically four) of equi-angularly spaced heads 15, the heads at the inner and outer ends 14a and 14b of the bolt being relatively offset for the known purpose of better adapting the position of the bolt actuating parts for more convenient and compact arrangement within the case. The bolt ends 14a and 14b are separated by a circular flange 16 received within a corresponding opening in flange 12 of the case. The bolt is rotatable on a shaft 17 supported at its inner end by guide flange 18 integral with the case and at its outer end by the usual bracket or semi-housing 19. Further details and advantages concerning the particular form of bolt illustrated, are described at length in my co-pending application Ser. No. 511,939 filed November 27, 1943, on Reversible rotary bolt locks.

The case flange 12 carries in spaced and overlying relation to the bolt 14, a horizontally extending projection or lug 20 which also may be regarded as a keeper by reason of its engageability with the keeper 11 to maintain the latched members in vertically supported condition. The lug 20 may consist of a hollow shell attached to or formed integrally with the case flange 12. As will be understood, as the latch parts close against the stationary keeper 11 by movement toward the right, keeper 11 is received between the bolt and the lug 20. In the home or latched position of the parts, see Fig. 1, the inclined surface 11a of the keeper is tightly engaged by the bolt head, and the top surface 11b of the keeper is snugly or tightly engaged against the undersurface 21 of the lug 20.

The bolt 14 may be actuated by the usual cam mechanism, generally indicated at 22, and which may comprise one or more differential length cams 23 and 24 engageable with the inner end 14a of the bolt. The cams are pivotally carried on a shaft 25 supported at its inner end within the flange 18 and extending outwardly through the case flange opening 26 and lug 20 to terminate at 27 in the outer face thereof. Optionally I may use in conjunction with the cams 23 and 24, an oscillatory step plate 28 also pivoted on shaft 25 having a series of stepped surfaces 29 sequentially movable against the cam-engaged head of the bolt during bolt advancement by the cams to positively lock the bolt against reverse rotation.

Further particulars of the step plate structure and operation are disclosed in detail in my co-pending application Ser. No. 497,594, filed August 6, 1943, on Lock mechanism. The cams 23 and 24, and the step plate 28, are urged in a clockwise direction against the bolt, as viewed in Fig. 3, by individual coil springs 30 supported at 31 and bearing against individual shoulders 32 on the cams and step plate.

Any suitable operating mechanism may be employed to retract the cams and step plate from their bolt-holding positions, as from the home position of Figs. 1 and 3, to release the bolt for reverse or anti-latching rotation and disengagement from the keeper 11. Merely as illustrative, the retracting mechanism is shown to comprise a vertically displaceable plate 33 slideable along the inner face of the case flange 13 and guided by engagement with projections 34, 35 and a pin 36 extending inwardly from the flange 13 through slot 37 in the plate. The plate has an arm portion 38 engageable with shoulders 39 on the cams 23 and 24 and the step plate 28, so that downward displacement of the plate 33 swings the cams and step plate upward from their bolt latching positions sufficiently to clear or permit retractive rotation of the bolt 14. Plate 33 normally is maintained in the raised position of Fig. 2 by a coil spring 40 supported at 41 and bearing against the lower end 42 of the plate.

The cams and step plate are retractable by the usual outside door handle, not shown, the spindle 43 of which carries an arm or roll-back 44 engageable with the upper turned end 45 of member 33 to displace it downwardly against the resistance of spring 40. The releasing plate is similarly controlled by an inside door handle, not shown, connected to the retracting link 46 which is pivotally attached at 47 to lever 48, the latter in turn being pivotally movable about the stationary pin 36. Upon movement of link 46 to the right, lug 49 projecting from the lever 48 is swung downwardly against shoulder 50 on the plate 33, thus displacing the latter down to the aforesaid cam-releasing position. As will be understood, upon release of the outside and inside operators 44 and 46, plate 33 is returned by spring 40 to its normal position.

The invention is concerned primarily with the improved safety catch device, generally indicated at 51, and its operative association with the keeper 11 and the bolt and cam mechanism. The device 51 comprises a safety catch element or bolt 52 contained within the lug 20 and mounted for rotary or oscillatory movement about the cam supporting shaft 25. As best illustrated in Figs. 6 to 8, the safety catch element 52 has a pair of arm portions 53 and 54 containing openings 55 to receive the shaft 25.

Viewed in Fig. 2, the arm 54 is positioned at the inside of the case flange 12 and in side-by-side relation to the cam 24, so that the top shoulder 56 of the arm becomes engageable by arm 38 of the retracting plate 33, for releasing the safety catch as will presently appear. Formed integrally with the safety catch arm portion 53 is a downwardly projecting dog 57, the face 58 of which has a center of curvature at the axis of the shaft 25. The dog 57 is yieldably thrust down to the projected position shown in Figs. 1 and 2, by a coil spring 63, one end 64 of which bears against the top wall of the lug 20 and the other end of the spring being received within a notch 65 in the safety catch element. Opening 26 in the case flange permits insertion of the safety catch and spring assembly inside the lug 20.

As mentioned, the face 58 of the holding dog 57 preferably is curved and has its center of curvature at the axis of rotation of the element 52. The keeper notches, 60, 61 and 62, preferably are shaped in conformity with the curvature of the dog surface 58 to positively prevent accidental disengagement of the dog from holding position within any of the keeper notches, and still permit smooth retractibility of the dog from the notch when swung upward by action of the retracting plate 33. Accordingly, the notch surfaces 64 are curved in conformity with the curvature of the dog surface 58 so that in the holding positions of the dog, the parts have full surface engagement and any thrust of the dog is on a radial center line of the shaft 25, and therefore ineffective to displace the dog from the notch.

In considering the operation of the latch mechanism, first assume the case-carried parts to be disengaged from the keeper 11 and to be moved toward the right, relative thereto, to bring the bolt end 14b into engagement with the forward end of the keeper. Notch 60 may be positioned so that within a suitable range of the initial bolt rotation after engagement with the keeper, say within a range of 25 degrees bolt rotation, the safety catch dog snaps into the keeper notch from a raised position to which it initially is cammed by engagement with the keeper. If the latch is closed no further, or for any reason is accidentally released from any advanced position without intentional retraction of the safety catch, the latter serves by its engagement within notch 60 to hold the case-carried parts against further retraction from the keeper, as illustrated by the positions of the parts in Fig. 4.

As the bolt is advanced along the keeper toward latched position, such advancement initially is resisted by the engagement of the cams 23 and 24 with the inner bolt end 14a until the cams become displaced upwardly against the resistance of springs 30 to the cam tripping position, i. e. the position at which the cams slide past the end of one bolt head 14c into engagement with the next bolt head 14d. In Fig. 5, the cams are shown to be at substantially the tripping point. Upon slight counterclockwise rotation of the bolt from the position shown the cams are released from their displaced relation to the bolt head 14c, to swing downwardly into engagement with the succeeding bolt head 14d. The keeper notch 61 desirably is positioned so that it is entered by the dog 57 at substantially, or just slightly in advance of the bolt rotation beyond the cam tripping position, so that should the bolt and cam engagement become wedged at the tripping position, and therefore without the cams having become tripped to hold the bolt against the reverse or anti-latching rotation, that function is performed by the dog 57 independently of the bolt and cams.

Upon bolt rotation beyond the position of Fig. 5, the cams 23 and 24 act against the bolt to advance it in a latching direction to the fully latched or home position of Figs. 1 and 3. The keeper notch 62 is positioned to enable the dog 57 to hold the parts against retraction from this home position. Preferably, the notch 62 is positioned so that it will receive the dog 57 before advancement of the bolt to the full home position which it is capable of reaching under the influence of the cams, so that if in a given instance or installation the door reaches a fully closed position in advance of the potential home positions of the bolt and keeper, the safety catch nevertheless will have engaged to hold the parts against retraction.

As will be understood from the foregoing, the cams and step plate may be retracted from their bolt holding positions, and the safety catch may be retracted from any of its projected or keeper engaging positions, by downward movement of the retracting plate 33 when displaced by the outside operator 44 or the inside operator 46, as previously explained.

The variational form of the invention shown in Figs. 10 to 15 has operating characteristics similar to the described embodiment, but differs structurally in that the case-carried assembly of the mechanism is brought to engage between and to coact with spaced keepers above and below that assembly. As before, the latch mechanism comprises a case 65 having flange portions 66 and 67, the former having integral therewith an open bottom, forwardly projecting housing 68, having a closed outer wall 69, see Fig. 13. The case carries a rotary bolt 70 rotatable on a pin 71 terminating at 72 and 73 in the housing wall 69 and case flange 66, respectively. The housing 68 and bolt 70 are movable between keepers 74 and 75 integral with the pillar-supported keeper plate 76, see Figs. 14 and 15. In the latched condition of the parts, appearing for example in Fig. 12, the bolt and top flange 77 of the housing are snugly or tightly engaged between and respectively against the inclined keeper surface 78 and the undersurface 79 of the lug or keeper 74.

The bolt actuating means is shown to comprise a pair of vertically sliding wedges or cams 80 and 81 engageable with the housing surface 82 and having extensions 83 received between surface 82 and the guide 84. The cams are urged into wedging engagement with the bolt by coil springs 85, one for each cam, bearing against shoulders 86 thereof.

The safety catch comprises an arm 87 pivotally mounted on pin 88 and normally urged in a counter-clockwise rotation by spring 89 bearing at 90 against the arm, and at its other end 91 against the housing 68. Arm 87 has a holding dog 92 normally projecting upwardly through opening 93 in flange 77 of the housing, and receivable within notches 94, 95 and 96 in the undersurface 79 of the keeper 74. Surface 92a of the holding dog has its center of curvature at the axial center of pin 88. The keeper notches 94, 95 and 96 correspond respectively to notches 60, 61 and 62 in the first described form, with respect to their shape characteristics and their positional relationship to the sequential positions of the bolt, keeper 75 and the cams 80 and 81, as the bolt advances from initial keeper engagement position through the cam tripping position to the final home position.

The housing 68 contains at the inside of the bolt 70 a pivotally movable retracting plate 97 mounted for oscillatory movement on the bolt shaft 71. The plate 97 carries a forwardly projecting lug 98 engageable with the lower ends of the cams 80 and 81 to elevate them to retracted positions upon counter-clockwise rotation of the retracting plate. The latter also is shaped to provide a shoulder 99 engageable with the lower turned end 100 of the safety catch arm 87, to swing the latter clockwise and retract the dog 92 from the keeper, in the same rotation of the plate 97 which retracts the cams. Plate 97 carries an arcuately shaped arm 101, portion 102 of which lies at the outside of the case flange 66, and is bent inwardly at 103 through slot 104 in the case to bring the turned end 105 of the arm at the inside of the case flange 66, as appearing in Fig. 13.

Figure 11:
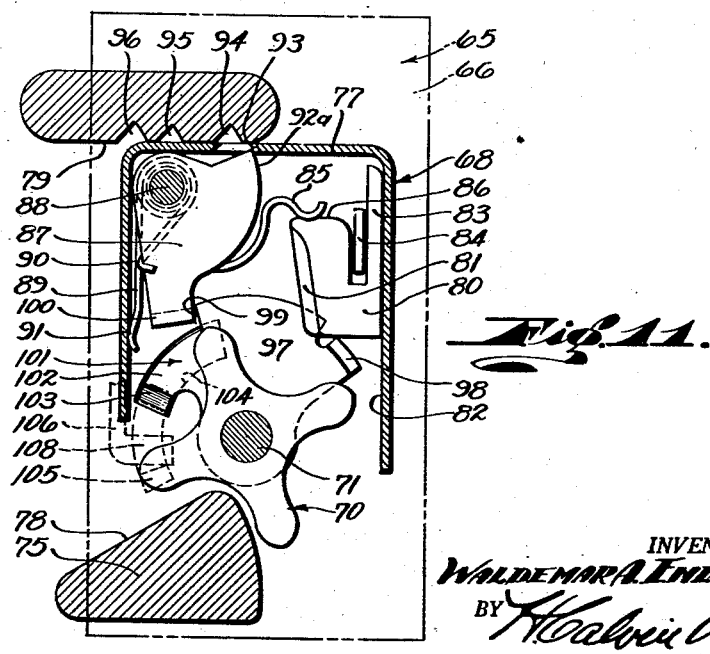
Fig. 11 shows the retracted positions of the cams and safety catch, with the bolt released for disengagement from the wedge keeper.

The plate 97 is movable to its cam and safety catch retracting position of Fig. 11 by a member 106 pivoted on pin 107 and carrying a lug 108 engageable with the retracting plate arm 105. Member 106 normally is urged against counter-clockwise turning by coil spring 109 bearing against the shoulder 110. Suitable means may be provided for rotating member 106 to actuate plate 97 in its retracting movement selectively from the inside and outside of the door. As illustrative, the outside handle spindle 111 is shown to carry an arm 112 engageable with the stop 113 and also with arm 114 of the member 106. Link 115, controllable by the inside door handle has a pin and slot connection at 116 with the lower portion of member 106. The latter thus is responsive to operation of either the arm 112 or link 115 to rotate the plate 97 in its retracting travel.

Within the range of initial bolt rotation following engagement of the bolt against the keeper 75, the dog 92 enters notch 94 to establish the first safety catch position. Then as the bolt continues to advance and the cams 80 and 81 are elevated by the bolt engagement therewith, the dog 92 enters notch 95 just in advance of the bolt arrival at the cam tripping position, i. e. just in advance of the bolt position in Fig. 10. Finally, as the bolt is further advanced to the home position of Fig. 12, the dog 92 enters notch 96 in advance of the bolt arrival at the full home position, say within the range of 5 degrees bolt rotation in advance of that position. To release the parts, counter-clockwise rotation of plate 97 by way of member 106 and either the outside or inside operators 112 and 115, retracts the cams 80 and 81 from the bolt and the holding dog 92 from the keeper 74, releasing the housing and bolt assembly for disengagement from the keepers.

I claim:

1. In a latch mechanism for releasably holding together two relatively movable members, a bolt adapted to be carried by one of said members and movable forwardly within a predetermined range of travel as said members are brought together to latched posiiton, means releasably holding the bolt against reverse movement, keeper means adapted to be carried by the other of said members, and auxiliary holding means engageable with said keeper means and operable independently of the bolt and said holding means to hold the bolt against said reverse movement at different positions within its said predetermined range of travel.

2. In a latch mechanism for releasably holding together two relatively movable members, a rotary bolt adapted to be carried by one of said members and rotatable forwardly within a predetermined range of rotation as said members are brought together to latched position, means releasably holding said bolt against reverse rotation, keeper means adapted to be carried by the other of said members, and auxiliary holding means engageable with said keeper means and operable independently of the bolt to hold the bolt against said reverse rotation at different positions within its said predetermined range of rotation.

3. In a latch mechanism for releasably holding together two relatively movable members, a bolt adapted to be carried by one of said members and movable forwardly within a predetermined range of travel as said members are brought together to latched position, means releasably holding the bolt against reverse movement, keeper means adapted to be carried by the other of said members, auxiliary holding means engageable with said keeper means and operable independently of the bolt and said holding means to hold the bolt against said reverse movement at different positions within its said predetermined range of travel and control means common to both said holding means and operable to release the first mentioned holding means to permit reverse movement of the bolt, and operable also to release said auxiliary holding means when holding the bolt against reverse movement at any of said different positions.

4. In a latch mechanism, a movable bolt, a keeper opposite the bolt in its latched position, means for urging and advancing the bolt against the keeper in a latching direction, and holding means engageable with said keeper and operable independently of the bolt to hold the bolt at successive positions within its advancing movement in said direction, against bodily movement in an opposite direction away from the keeper.

5. In a latch mechanism, a rotary bolt, a keeper opposite the bolt in its latched position, cam means for urging the bolt in a latching direction, said cam means being displaced by the bolt to a tripping position and the bolt then being urged by the cam means in a latching direction, and holding means engageable with said keeper and operable independently of the bolt to hold the bolt against bodily movement in a reverse direction from different predetermined positions.

6. In a latch mechanism, a rotary bolt, a keeper opposite the bolt in its latched position, cam means for urging the bolt in a latched direction, said cam means being displaced by the bolt to a tripping position and the bolt then being urged by the cam means in a latching direction, and holding means engageable with said keeper and operable independently of the bolt to hold the bolt against bodily movement away from the keeper at a position reached by the bolt immediately in advance of the position at which it trips said cam means.

7. In a latch mechanism, a rotary bolt, a keeper opposite the bolt in its latched position, cam means for urging the bolt in a latching direction, said cam means being displaced by the bolt to a tripping position and the bolt then being urged by the cam means in a latching direction, and holding means engageable with said keeper and operable independently of the bolt to hold the bolt against bodily movement away from the keeper at a position reached by the bolt after tripping of said cam means.

8. In a latch mechanism, a rotary bolt, a keeper opposite the bolt in its latched position, cam means for urging the bolt in a latching direction, said cam means being displaced by the bolt to a tripping position and the bolt then being urged by the cam means in a latching direction, and holding means engageable with said keeper and operable independently of the bolt to hold the bolt against bodily movement away from the keeper at a first position reached by the bolt in advance of its cam tripping position, and at a second position reached by the bolt at substantially the position at which said cam means is tripped, and at a third position beyond said second position in the direction of latching rotation of the bolt.

9. In a latch mechanism, a rotary bolt, a keeper engageable by the bolt, means for actuating the bolt, said actuating means being displaced by the bolt to a tripping position and the bolt then being urged by said means in a latching direction, and releasable holding means operable independently of the bolt during movement of the bolt in a latching direction to lock the bolt at different positions against movement in an opposite direction.

10. In a latch mechanism, a rotary bolt, a keeper engageable by the bolt, means for actuating the bolt, said actuating means being displaced by the bolt to a tripping position and the bolt then being urged by said means in a latching direction, and releasable holding means operable independently of the bolt during movement of the bolt in a latching direction to lock the bolt against movement in an opposite direction at positions in advance of and beyond its position at which said actuating means is tripped.

11. In a latch mechanism, a rotary bolt, a keeper engageable by the bolt, means for actuating the bolt, said actuating means being displaced by the bolt to a tripping position and the bolt then being urged by said means in a latching direction, and releasable holding means operable independently of the bolt during movement of the bolt in a latching direction to lock the bolt against movement in an opposite direction from a position reached at substantially the tripping of said actuating means.

12. In a latch mechanism, a rotary bolt, a pair of keepers opposite the bolt in its latched position, one of said keepers being engaged by the bolt, and holding means engageable with any one of a series of spaced shoulders on the other of said keepers and operable independently of the bolt to hold the bolt against bodily movement away from said bolt-engaged keeper.

13. In a latch mechanism, a case, a rotary bolt supported by the case, a pair of keepers opposite the bolt in its latched position, one of said keepers being engaged by the bolt, and holding means supported by and projecting out of said case, said holding means being engageable with the other of said keepers and operable independently of the bolt to hold the bolt and case against bodily movement away from said bolt engaged keeper at different spaced locations relative thereto.

14. In a latch mechanism, a rotary bolt, a keeper containing a series of spaced notches each forming a circularly curved shoulder, and a pivotally movable spring-pressed holding element having a surface curved in conformity with the curvature of said shoulders and engageable therewith to hold the bolt against bodily movement away from the keeper at positions corresponding to the locations of the shoulders.

15. In a latch mechanism, a rotary bolt, a pair of keepers opposite the bolt in its latched position, one of said keepers being engaged by the bolt in its latched condition, and holding means engageable with the other keeper and operable independently of the bolt to hold the bolt against anti-latching movement at different locations along the keeper.

16. In a latch mechanism, a rotary bolt, cam means for actuating the bolt, said cam means being displaced by the bolt to a tripping position and the bolt then being urged by the cam means in a latching direction, a pair of keepers opposite the bolt in its latched position, one of said keepers being engaged by the bolt, spring-pressed holding means engageable within spaced recesses in the other of said keepers to lock the bolt against movement away from said bolt-engaged keeper at positions in advance of and beyond the bolt position at which said cam means is tripped, and means operable to release both said cam means from operative engagement with the bolt and said holding means from holding engagement with the keeper.

17. In a latch mechanism, a rotary bolt, a pair of relatively movable and interengageable members opposite and at one side of the bolt in its latched position, one of said members comprising a keeper engaged by the bolt in its latched condition, and holding means engageable with said keeper and comprising an element pivotally carried by the other member and operable independently of the bolt to hold the bolt against anti-latching movement at different locations along the keeper.

18. In a latch mechanism, a rotary bolt, a member opposite and spaced from the bolt, a keeper adapted to be received between the bolt and said member and engageable by the bolt, and releasable holding means comprising an element supported by said member and biased into engagement with said keeper, said element being operable at different locations along the keeper to hold the bolt against movement in an anti-latching direction.

19. In a latch mechanism, a rotary bolt, a relatively stationary member opposite and spaced from the bolt, a relatively movable keeper adapted to be received between the bolt and said member and engageable by the bolt, and releasable holding means mounted within said member and engageable with said keeper to hold the member and keeper against relative movement in an anti-latching direction.

WALDEMAR A. ENDTER.